BALANCED BISTABLE MULTIVIBRATOR DIGITAL DETECTOR CIRCUIT

Filed Feb. 6, 1967

INVENTORS D. J. LYNES
S. G. WAABEN
BY
Charles Scott Phelan
ATTORNEY

United States Patent Office 3,480,800
Patented Nov. 25, 1969

3,480,800

BALANCED BISTABLE MULTIVIBRATOR DIGITAL DETECTOR CIRCUIT

Dennis J. Lynes, Madison, and Sigurd G. Waaben, Princeton, N.J., assignors to Bell Telephone Laboratories, Incorporated, Murray Hill and Berkeley Heights, N.J., a corporation of New York

Filed Feb. 6, 1967, Ser. No. 614,237
Int. Cl. H03k *3/286*
U.S. Cl. 307—292 17 Claims

ABSTRACT OF THE DISCLOSURE

In a direct-coupled balanced detector, diodes couple input signals to control the state of an emitter-gated multivibrator circuit as a function of diode conduction levels during the turn-on of the multivibrator circuit. Input signals are supplied to the diodes by way of a differential amplifier and a balanced emitter-follower. The multivibrator circuit output is taken through another balanced emitter-follower driving a balanced common emitter amplification stage.

BACKGROUND OF THE INVENTION

Field of the invention

This invention relates to digital detector circuits and it relates particularly to digital detectors having a dynamic threshold of detection.

Description of prior art

It is known in the prior art to employ a flip-flop circuit with an input threshold to discriminate between binary ONE and ZERO information signals. However, such known circuits usually employ alternating current coupling to isolate the flip-flop input connections from a direct-current standpoint in order to assure consistent threshold operation. Such alternating current coupling is difficult to reproduce on an integrated circuit basis. In addition, in high speed operation such coupling is also subject to signal bias build-up as a result of certain types of digital information patterns in the signal applied thereto.

In many circuit applications of digital detector circuits a memory system is involved in which a memory readout operation is followed by a memory writing operation. In such a system it is necessary to prevent the write-in disturbance from affecting information which had previously been read out. For this purpose some prior art circuits gate an input coupling amplifier to make it insensitive to the disturbing signals and thereby prevent disturbance of a following flip-flop detector circuit. However, the noise resulting from the gating of such an input amplifier often is of a character which could itself disturb the flip-flop circuit when the gating signal is removed. Accordingly, it is necessary in such cases to allow a time guard space so that those gating noise signals may be dissipated before the detector is enabled. In other systems the contents of a flip-flop detector circuit are dumped into a buffer register prior to the time of occurrence of a disturbance resulting from a memory writing operation. However, this technique requires a significant amount of additional hardware.

Accordingly, it is one object of the invention to improve digital detector circuits.

It is another object to reduce the dependence of digital detector circuits on alternating current coupling elements.

A further object is to reduce the need for a buffer register to receive detector output.

Still another object is to facilitate the use of high sensitivity detecting techniques in digital detectors.

SUMMARY OF THE INVENTION

The aforementioned and other objects of the invention are realized in an illustrative embodiment thereof in which a balanced detector includes diodes for coupling a low impedance signal source to control the state of a gated dynamic threshold circuit. The normally conducting diodes are biased OFF by the threshold circuit action when it is gated ON; but, in the process, any unbalance in the diode previous conduction levels as a function of the detector input signals determines the state of operation that the threshold circuit will indicate as it turns ON.

It is one feature of the invention that the threshold circuit functions can be performed by a bistable multivibrator.

Another feature is that a multivibrator turn-on state threshold is employed to detect the sense of unbalance in diode conduction levels so that extreme detection sensitivity is realized without being subject to the threshold level temperature sensitivity. Furthermore, interelectrode capacitances in the multivibrator circuit shield the multivibrator from error-injecting effects of fast noise perturbations on input signals.

A further feature is that the diodes in their nonconducting state isolate the threshold circuit from input signals as long as the circuit is gated ON. Consequently, an additional buffer register is not required.

Still another feature is that the diodes in conduction clamp multivibrator input to the input signal level so that the multivibrator operates as a differential amplifier for a significant time before the diodes are biased off.

BRIEF DESCRIPTION OF THE DRAWING

The various features, objects and advantages of the invention may be better understood from a consideration of the following detailed description when taken in connection with the appended claims and the attached drawing in which:

DETAILED DESCRIPTION

Figure 1:
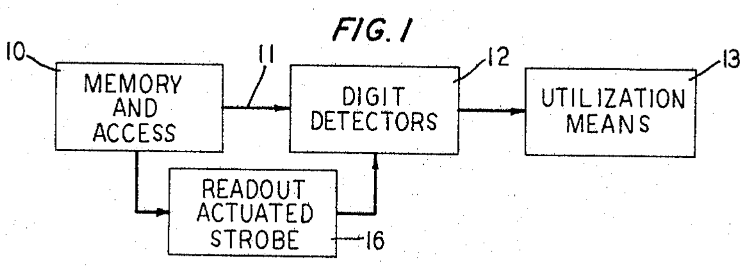
FIG. 1 is a simplified block and line diagram of a memory employing digital detectors in accordance with the present invention.

In FIG. 1 a memory and access circuit 10 represents any suitable magnetic memory arrangement known in the art, together with its associated access circuits for memory address translation and for actuating memory devices at selected addresses in accordance with predetermined sets of information states by applying appropriate drive signals for selectably actuating such devices. During memory readout time information signals are developed on memory sensing circuits which are schematically represented by a lead 11 in the drawing. The sensing circuits 11 are coupled to digital detectors 12 which include a separate detector for each digit line of the memory 10. The detectors determine for each digit line whether a binary ONE or a binary ZERO signal is being produced by the memory in such line and such detected information is made available to any suitable utilization means 13.

Typically, address signals for selecting a memory address will be provided by other parts of a data processing system, not shown, which includes the arrangement of FIG. 1. The utilization means 13 would comprise processing system circuits for receiving data which is read out of the memory and access circuits 10 through detectors 12.

Figures 1A, 2:
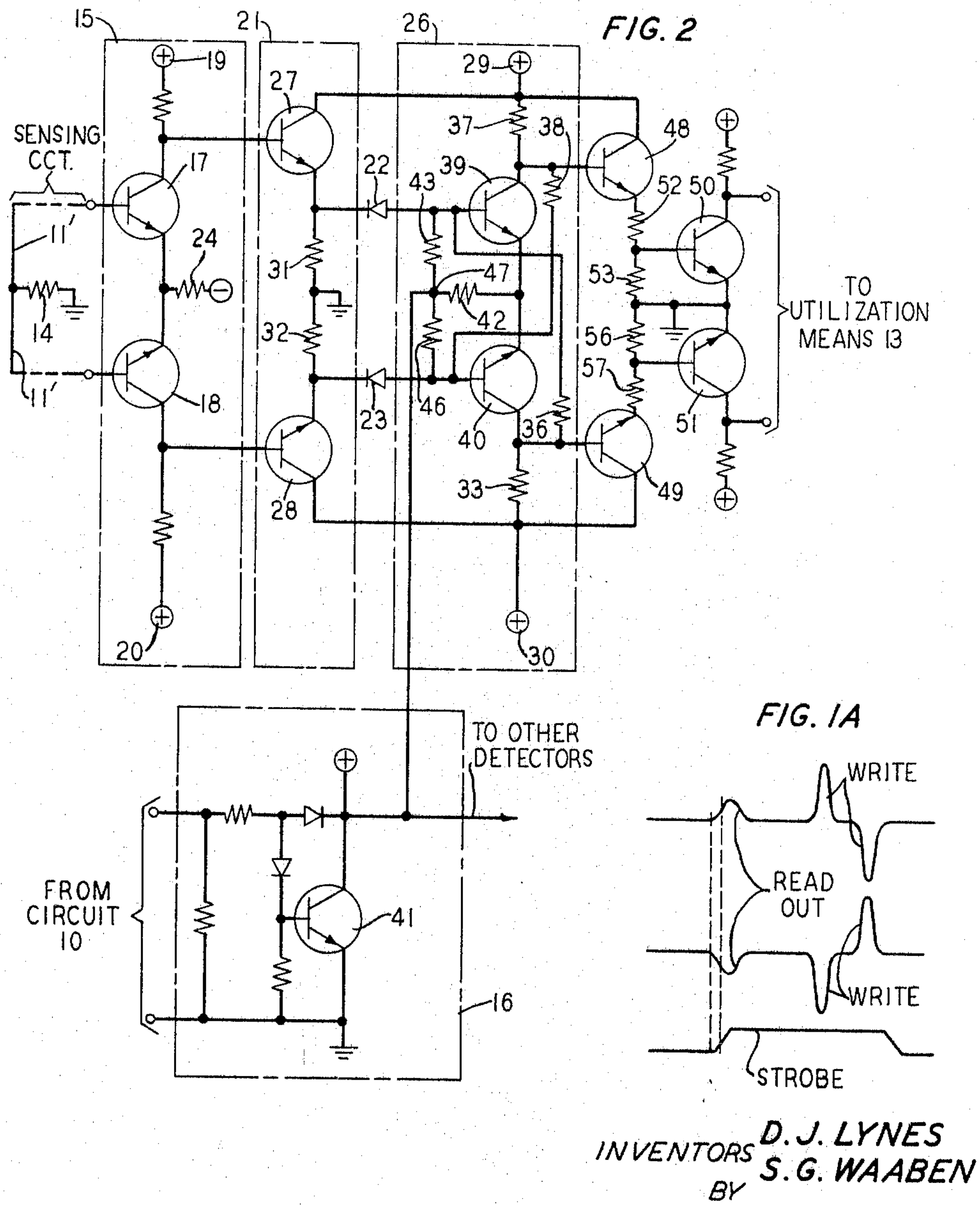
FIG. 1A is a diagram of signal waveforms, not to scale, illustrating a sequence of operations.
FIG. 2 is a schematic diagram of a digital detector in accordance with the invention.

A readout actuated strobe circuit 16 detects the leading edge of a readout signal to the sensing circuits 11 and strobes the detectors 12 at an appropriate time. A typical relationship between a strobe pulse from circuit 16 and a binary ONE readout and write-in noise on a sensing circuit 11 is shown in FIG. 1A. The strobe pulse causes the sensing circuit signal conditions regardless of variable factors such as variable sensing signal delays due to origination at different memory addresses. In particular, such strobe must be applied to the detectors after a sensing circuit signal has begun in order to assure accurate sensitive operation. However, the amount of such delay is not critical because of the high sensitivity of the detectors as will be described.

In FIG. 2 schematic details of one of the digit detectors 12 are presented. The input of the detector in FIG. 2 includes a differential amplifier 15 in which two transistors 17 and 18 are interconnected for receiving balanced signals and rejecting longitudinal signals from a sensing circuit 11' in the memory and access circuits 10. Diagrams of typical sensing circuit signals are shown in the top two waves of FIG. 1A. The sensing circuit 11' may comprise, for example, electrically conductive circuits having magnetic material coated thereon with such material having a substantially rectangular hysteresis loop. The application of drive signals from the access portion of the circuits 10 selects a certain location on the sensing circuit 11' and switches flux in the magnetic material plated thereon for inducing a signal in the circuit 11'.

A ground connected resistor 14 is shown in FIG. 2 to represent schematically a return path to ground for the base electrodes of transistors 17 and 18, but many suitable sensing circuit configurations can be employed.

The circuit 11' is direct-current coupled between the base electrodes of transistors 17 and 18 for presenting differential mode signals thereto. No transformer coupling, as is so common in the art for isolation and common mode rejections, is employed so one obstacle to circuit integration is overcome. The differential mode signals are typically associated in some time manner with longitudinal mode signals also, and the latter must be rejected. The differential mode signals cause the transistors 17 and 18 to conduct at different current levels in a manner which is known in the art for producing corresponding balanced output signals at the collector electrodes of the respective transistors. Longitudinal mode signals affect both transistors essentially the same and produce no net change in amplifier output.

Operating potentials are supplied to transistors 17 and 18 from sources 19 and 20, which in fact are the same source as is typically the case in balanced circuits, and have a common emitter resistor 24 returned to negative potential. The potential sources in FIG. 2 are schematically represented by a circled polarity sign to indicate a potential source having its terminal of the indicated polarity connected at the point of the circled polarity sign and having its terminal of opposite polarity connected to ground. In the case of the transistors 17 and 18, the operating potential is supplied to maintain the transistors 17 and 18 in continuous conduction in response to any anticipated input signal level. However, the sources and supply impedances are further designed to maintain a reverse conducting bias across the collector-base junctions of such transistors and thereby prevent them from operating in a saturated conduction state. This arrangement also imposes a predetermined maximum limitation upon the amplitude of the output signals produced at the collector electrodes of transistors 17 and 18 as is known in the art for differential amplifiers. The limitation is utilized for a purpose which will be subsequently described. The prevention of saturated conduction permits the transistors 17 and 18 to follow input signal variations rapidly and without the delay times injected by occasional needs to recover from a saturated conducting condition. In addition, the operation of the differential amplifier in a linear conduction range causes it to present a substantially continuous input impedance to the sensing circuit 11'. Such a high input impedance helps to reduce ring-around problems which often occur in memory sensing circuits. Ring-around is a state in which a pulse injected in a digit circuit loop repeatedly circulates therein with decreasing but significant magnitude.

The output of the differential amplifier 15 is direct-current coupled by way of a balanced emitter-follower 21 and a pair of diodes 22 and 23 to input connections of a trigger circuit 26 with a dynamic threshold of operation. The latter circuit is advantageously arranged in the form of an emitter-gated bistable multivibrator circuit. Emitter-follower 21 serves as an input signal-sensitive voltage source for cooperating with the multivibrator 26 to control the conduction states of diodes 22 and 23. Two transistors 27 and 28 are included as the active elements of the emitter-follower circuit 21 and receive at their base electrodes, by direct-current connections, balanced signals from the differential amplifier 15. Operating potential is supplied to the transistors 27 and 28 through sources 29 and 30, and a pair of resistors 31 and 32 connect emitter electrodes of the respective transistors to ground. The operating potential so supplied is designed to maintain transistors 27 and 28 in their linear conducting range for the full anticipated range of signals from amplifier 15. The emitter-follower 21 also functions to maintain a predetermined constant high impedance state at the collector electrodes of the transistors in the differential amplifier 15 for all input signal conditions and for all conducting and nonconducting states of the multivibrator 26. The emitter-follower also helps to keep the impedance presented to the input of the flip-flop circuit 26 independent of current amplification conditions in the amplifier 15.

Direct current coupling employed throughout the detector of FIG. 2 facilitates circuit integration. In addition, the problem of bias build-up in response to certain information signal patterns is avoided.

Diodes 22 and 23 normally operate together in either a conducting or a nonconducting condition, and their conducting conditions are the opposite of the condition of the multivibrator 26. That is, when the multivibrator 26 is conducting in either one of its stable states, diodes 22 and 23 are nonconducting; and, conversely, when the multivibrator is nonconducting, the diodes are conducting. Normal bias for the diodes is supplied cooperatively by portions of the multivibrator circuit and by the emitter-follower circuit 21. Thus, a direct current path for conduction through diode 22 etxends from the source 30 through a collector resistor 33 and a feedback crosscoupling resistor 36 in the multivibrator 26, the diode 22, and the emitter resistor 31 of the emitter-follower 21 to ground. The conducting state of diode 22 is influenced by the input signal conditions which determine the level of current flow in resistor 31 and by the multivibrator conditions which determine the level of current flow in crosscoupling resistor 36. In a similar manner a direct-current path for the diode 23 can be traced from the source 29 through a collector resistor 37, a crosscoupling feedback resistor 38, the diode 23, and the emitter-follower resistor 32 to ground.

When the multivibrator is in a nonconducting state, as it initially is since it lacks a continuous ground return path for the emitter electrodes of its transistors 39 and 40, current flow in the aforementioned diode current paths causes the diodes 22 and 23 to conduct. Their individual conduction levels differ, however, to the extent of differences in the input signal level with respect to ground at the base electrodes of transistors 17 and 18. Such differences are coupled from the amplifier transistors 17 and 18 into the emitter-follower 21 as unequal potential differences across resistors 31 and 32.

The readout actuated strobe circuit 16 is shown in part in FIG. 2. It receives positive-going signals from the memory and access circuit 10 for biasing a transistor 41 into conduction at a predetermined time during signals in the sensing circuits 11. The turn-on of transistor 41 occurs advantageously during the rise time of signal pulses in sensing circuits 11. This action provides a ground return path for emitter electrodes of transistors 39 and 40 in multivibrator 26 in FIG. 2 and for all other ones of the corresponding multivibrators in detectors 12. Such path includes a common emitter circuit resistor 42 as well as the internal collector-emitter path of transistor 41. Multivibrator 26 is now enabled for shifting into conduction in one or the other of its stable operating states and conduction in diodes 22 and 23 is inhibited in a manner to be described.

The shift of multivibrator 26 from a nonconducting state to one of its two stable conducting states is accomplished by a transition through a state of significant duration in which the multivibrator transistors operate as a difference amplifier. During the transient amplifier operation mode the transistors amplify input signal levels at their base electrodes. They are barred from the regenerative switching mode of multivibrators as long as diodes 22 and 23 continue to conduct and thereby clamp multivibrator transistor base electrodes at voltage levels provided by emitter follower 21 so that multivibrator cross-coupling circuits are unable to control base electrode signal levels. As the multivibrator transistor conduction levels increase, the transistors divert current from resistors 36 and 38 and thus from diodes 22 and 23. Ultimately the diodes 22 and 23 are unable to sustain conduction. When the diodes become nonconducting, the clamp on the base electrodes of transistors 39 and 40 is released and normal regenerative multivibrator action takes over to cause the transistor that was thretofore conducting at the higher level to seize full multivibrator conduction.

It is noted that diodes need only a low impedance source to realize their clamping action on the multivibrator. Amplifier 15 and emitter-follower 21 cooperate to provide such a source as well as limiting gain and impedance matching. In an application that does not require limiting, the circuit 11' can be the needed low impedance signal source directly coupled to diodes 22 and 23.

The conductor level of transistors 37 and 40 at which diodes 22 and 23 are biased nonconducting, as just described, is a function of the magnitudes of the various bias resistor sizes in the circuit and will vary from one application to another. The level is not critical, however. The limiting considerations are, on the one hand, selection of resistors of such magnitude that the anodes of diodes 22 and 23 are ultimately drawn to lower voltage levels than their respective cathodes to be certain that they do get biased to a nonconducting condition. On the other hand, the transistors in the multivibrator 26 must act as amplifiers long enough and with sufficient gain to raise current levels to a point which is at least adequate to override the effects of transient device tolerance unbalances, e.g. current gain, resistance, and capacitance, insofar as control of multivibrator state is concerned. This latter effect eliminates the need for many stages of amplification often found in prior art circuits to realize an input signal of sufficient size to control the state of a multivibrator in spite of tolerance unbalances. A more detailed description of the actual detecting operation follows.

Two resistors 43 and 46 are provided to interconnect the base and emitter electrodes of the transistors 39 and 40, respectively, utilizing in common the resistor 42. All such resistors 42, 43, and 46 are interconnected at intermediate terminal 47. When the multivibrator is enabled by turning on transistor 41, the resistors 43 and 46 begin to divert current away from their adjacent diodes 22 and 23, respectively, toward the terminal 47 and transistor 41. In addition the current through resistors 36 and 38 is reduced as previously mentioned. The reduction of diode current tends to reduce each diode cathode potential slightly, but normal emitter-follower action maintains the cathode potential levels as a function of input signals from amplifier 15. As long as diodes 22 and 23 continue to conduct the base electrodes of transistors 39 and 40 are clamped at the output voltage levels of emitter-follower 21, but the current distribution in the various circuit branches changes.

Ultimately a reverse current bias condition is imposed on the diodes and they are driven into their nonconducting state. The diversion of current takes place over a small but finite part of the rise time of a signal received from strobe circuit 16 and also of the sensing circuit 11' signal. The diode turn-off time and the gain of the circuits of transistors 39 and 40 strongly influence the delay time in diverting current from the diodes. During such time the multivibrator transistors, with base electrodes clamped, are prevented from deciding the question of which will ultimately conduct until a sufficient part of the input signal rise time has expired to be certain that such signal will have sufficient amplitude to indicate correctly the binary information nature of such signal. The possibility of error resulting from small noise perturbations on the input signal at the beginning of its rise time is thus substantially reduced since the active decision period is a function of the rise time of the pulse from circuit 16.

During the delay time while diodes 22 and 23 are turning off, the transistors 39 and 40, with their newly found ground return path, are beginning to turn on. In so doing they divert current from the diodes through their base-emitter junctions and resistor 42 to terminal 47. The collectors of transistors 39 and 40 follow the voltages on their bases as controlled by the emitter-follower 21 in a manner similar to that of a differential amplifier. One of the transistors 39 or 40 is favored by the input signal unbalance represented by the previous conducting level difference of the diodes 22 and 23. It is believed that the operation herein described is enhanced because the effects representing such difference are stored briefly in interelectrode capacitances (not shown) of multivibrator 26 during the operation of transistors 39 and 40 as a differential amplifier. Such capacitances are associated with individual devices as well as being between electrodes of different devices. Consequently, it is not necessary to provide an input signal which is itself large enough to charge interelectrode capacitances and to override multivibrator tolerance unbalance factors. After diodes 22 and 23 are biased nonconducting, the favored multivibrator transistor seizes substantially full multivibrator current through the conventional multivibrator regenerative switching action.

It has been found that the transistor which ultimately conducts is the one with its base electrode connected to the one of the diodes which has been conducting at a higher level than the other one. Apparently the diode with higher conduction supplies more current to the diverting paths previously outlined thereby developing the larger multivibrator turn-on signals. Thus, the multivibrator transistor which is favored by the larger turn-on signal ultimately becomes the conducting transistor for the multivibrator.

It is well known that when operating potential is initially applied to a multivibrator any small noise or circuit unbalance can determine the final conducting state of the multivibrator. The level in a total multivibrator signal swing at which the small input unbalance becomes effective may vary for a variety of reasons, including temperature. However, the minimum magnitude of the difference needed to exercise control over the multivibrator does not change significantly with the mentioned level changes. The differences in level at which the difference becomes effective do not present a time-jitter problem because they are involved only during the time of regenerative switching of the multivibrator and such switching occurs almost instantaneously. Furthermore, the fact that multivibrator 26 is emitter-gated means that the base-emitter junctions of its transistors are OFF in the absence of a gating signal and the multivibrator is, therefore, sensitive to smaller input signal unbalances than would be the case if the circuit were collector-gated with its emitter-base junctions being forward biased at all times.

The small unbalanced input signal to the multivibrator is provided, as previously mentioned, by the diode different conducting levels. Such difference can be quite small even in a circuit built up of discrete components. However, in an integrated circuit embodiment in which all of the diodes, transistors, and resistors are contained on a single chip, there is a much higher probability of realizing balanced circuit elements at a practical manufacturing cost. Consequently, the current conduction difference in the diodes 22 and 23 which must be provided as a minimum, to be sure that other circuit element imbalances are not permitted to control, is quite small. Thus, the arrangement shown in FIG. 2 has an extremely high sensitivity; and in one embodiment, which was typical of realizable operations, a signal unbalance at the input to amplifier 15 of only 3 millivolts was accurately detected in the presence of longitudinal mode signals at the same input of approximately 150 millivolts. This sensitivity can be improved by improving component matches in the balanced circuits.

When the multivibrator 26 is in one of its stable conducting conditions the voltages at the base electrodes of both of the transistors 39 and 40 cooperate with the voltages at the emitter electrodes of transistors 27 and 28 to hold both of the diodes 22 and 23 in their nonconducting condition for the full range of signals which can be anticipated to be provided by the amplifier 15. Thus, in a memory system application the very large digit write noise, which is coupled to sensing circuit 11' and which has a magnitude at least several times the magnitude of a readout information signal in the same circuit, is unable to develop sufficient output from amplifier 15 to draw either of the diodes 22 or 23 into conduction. The multivibrator is, therefore, immune to such disturbance possibilities. In order to take advantage of this feature, the strobe signal in FIG. 1A from the circuit 16 is made of sufficient duration to overlap the appropriate portion of the memory readout time as well as the memory writing time which follows. The multivibrator 26 retains the previous readout information derived from sensing circuit 11', as has been described, during all this time. Upon removal of the strobe signal the multivibrator lapses into a nonconducting state once more and its contents are erased. Thus, it is not necessary to provide an additional buffer register into which the contents of the multivibrators 26 of the various detectors 12 can be transferred to avoid disturbing them by the aforementioned memory write noise.

In FIG. 2 output signals from the multivibrator 26 are coupled through a balanced emitter-follower circuit including two transistors 48 and 49 which are biased for continuous conduction and through a balanced common emitter circuit including two transistors 50 and 51. The latter two transistors are biased so that only one conducts, depending upon the information signal state coupled to their respective base electrodes from the multivibrator 26. The one of the transistors 50 and 51 which is thus conducting operates in a saturated state so that balanced output signals which are coupled from the transistor collector electrodes to the utilization means 13 are at logic levels and can be used for operating either integrated or discrete circuit logic arrangements. The emitter-follower circuit resistors 52, 53, 56, and 57 are employed for shifting output signals to a convenient level, e.g., to place binary ZERO signals near the zero amplitude level.

Multivibrator 26 is symmetrically loaded by the emitter-follower stage of transistors 48 and 49 so that neither stability condition of the multivibrator is favored by such loading. This factor further reduces the input signal magnitude required to control multivibrator state because it is not necessary to provide extra drive to override the effects of unbalanced loading which favor one state of multivibrator operation.

Although the present invention has been described in connection with a particular embodiment thereof, it is to be understood that additional embodiments and modifications which will be obvious to those skilled in the art are included within the spirit and scope of the invention.

What is claimed is:

1. In combination, a balanced trigger circuit having at least two different active conduction states and an inactive state, said trigger circuit including biasing impedances fixing said states, diode means connected to couple a balanced input signal to control the conduction state of said trigger circuit, means connected to said trigger circuit and said diode means to render said trigger circuit in a dynamic threshold mode of operation, means including said biasing impedances, and operative during said inactive state, biasing said diode means in a conducting condition at a level difference polarity which is indicative of the polarity of said balanced input signal, and said dynamic threshold rendering means including means actuating said trigger circuit from said inactive state to one of said active states as determined by said level difference polarity during said dynamic threshold mode of operation.

2. The combination in accordance with claim 1 in which a balanced emitter-follower circuit supplies said input signal, and exclusively direct-current means couple said diode means between the output of said emitter-follower circuit and the input of said trigger circuit.

3. The combination in accordance with claim 1 in which an emitter-follower circuit couples said input signal to said diode means.

4. The combination in accordance with claim 1 in which an emitter-follower circuit couples said input signal to said diode means.

5. The combination in accordance with claim 4 in which said trigger circuit comprises a pair of amplifiers cross-coupled for operation as a bistable trigger circuit.

6. The combination in accordance with claim 4 in which said biasing impedances include resistance means connected in a series circuit for applying bias potential to such diode means.

7. The combination in accordance wtih claim 1 in which said trigger circuit comprises first and second transistors each having base, emitter, and collector electrodes, said impedances include means crosscoupling the base electrode of each of said transistors to the collector electrode of the other of said transistors, means coupling said base electrodes through said diode means to ground, said impedances further include resistance means interconnecting the base and emitter electrodes of each of said transistors and including an intermediate terminal, and said actuating means includes means electrically connecting said terminal to ground at predetermined intervals for enabling said trigger circuit, said resistance means and said crosscoupling means cooperating in response to the operation of said gate means for simultaneously actuating said trigger circuit and inhibiting conduction in said diode means.

8. The combination in accordance wtih claim 4 which comprises in addition, a differential amplifier supplying said input signal to said emitter-follower, said amplifier including bias means for preventing current saturation by the largest anticipated input signal.

9. The combination in accordance with claim 4 in which a balanced emitter-follower circuit receives output signals from said trigger circuit, and a balanced output coupling circuit including first and second transistors couples output signals from the last-mentioned emitter-follower circuit to produce logic level signals, said transistors being coupled to said last-mentioned emitter-follower for operation in saturated conduction or in a nonconducting state in response to signals from such emitter-follower circuit.

10. The combination in accordance with claim 4 in which said input signal has a leading edge portion, and means in said actuating means initiate operation thereof during said leading edge portion

11. The combination in accordance with claim 4 in which either conduction state of said trigger circuit inhibits conduction in said diode means and such means in their conduction inhibited state have a predetermined conduction turn-on margin, and means supply to said emitter-follower input signals limited to a level within said margin.

12. The combination in accordance with claim 7 in which means including said resistance means hold base-emitter junctions of said transistors in a nonconducting state prior to operation of said actuating means.

13. The combination in accordance with claim 7 in which said impedances include means biasing said diode means are nonconducting in response to and for the duration of the enabling of said trigger circuit.

14. In combination, a source of input signals each having a predetermined finite signal rise time, an emitter-gated bistable multivibrator having active and inactive states of operation, diode means coupling said input signals to inputs of said multivibrator, said diode means having a turn-off delay time equal to a predetermined portion of said finite rise time, said diode means being biased for conduction by said multivibrator in said inactive state and biased nonconducting by said multivibrator in said active state, and means responsive to the initiation of said rise time emitter-gating said multivibrator into said active condition in accordance with said input signals.

15. The combination in accordance with claim 14 in which a balanced circuit receives signals from said multivibrator.

16. In combination means supplying input signals, a multivibrator connected for normal bistable operation, means coupling said input signals to inhibit said normal bistable operation and drive said multivibrator as a differential amplifier, and said multivibrator including means responsive to the amplification of said input signals in said multivibrator when operating as a differential amplifier to automatically disable said coupling means, thereby returning said multivibrator to its normal bistable mode of operation.

17. In combination a multivibrator having a nonconducting state and two stable conduction states of operation, a balanced emitter follower for supplying signals to select one of said two states according to the nature of said signals, means enabling said multivibrator for transition from said nonconducting state into one of its stable conduction states, and means responsive to said signals electrically clamping an input of said multivibrator to an output of said emitter follower, said clamping means including means delaying said transition of said multivibrator to said one stable state by a predetermined time after said enabling of said multivibrator.

References Cited

UNITED STATES PATENTS 3,181,004 4/1965 Guckel ----------- 307—238 X

OTHER REFERENCES

Pulse, Digital & Switching Waveforms by Mullman & Taub, pp. 362, 363, 389 and 390. Copyright 1965 by McGraw-Hill Bk. Co.

JOHN S. HEYMAN, Primary Examiner

U.S. Cl. X.R.

307—235, 238, 246, 276; 330—30